United States Patent [19]

Ahmed

[11] 4,015,765
[45] Apr. 5, 1977

[54] FORMATION AND UTILIZATION OF COMPOUND BILLET

[75] Inventor: Nazeer Ahmed, Princeton, N.J.

[73] Assignee: Western Electric Company, Inc., New York, N.Y.

[22] Filed: May 10, 1976

[21] Appl. No.: 685,000

[52] U.S. Cl. .................................. 228/131; 29/446; 29/522; 228/156; 228/173

[51] Int. Cl.² ......................................... B23P 11/02

[58] Field of Search ....... 228/126, 128, 131, 141 A, 228/173, 156; 29/522, 446, 421 R

[56] References Cited

UNITED STATES PATENTS

| | | | |
|---|---|---|---|
| 2,263,714 | 11/1941 | Bloomfield | 228/128 X |
| 2,337,247 | 12/1943 | Kepler | 29/446 X |
| 3,023,495 | 3/1962 | Noland | 29/446 X |
| 3,439,405 | 4/1969 | Berman | 29/446 X |
| 3,631,586 | 1/1972 | Bearpark | 228/131 X |
| 3,800,405 | 4/1974 | Ziemek | 228/126 |
| 3,937,385 | 2/1976 | Asada | 228/131 |

Primary Examiner—Al Lawrence Smith
Assistant Examiner—Nicholas P. Godici
Attorney, Agent, or Firm—A. S. Rosen

[57] ABSTRACT

Methods are disclosed for the formation and utilization of a compound billet wherein a longitudinally extending inner member, composed of a first material, is retained firmly within the interior of a hollow, longitudinally extending outer member, composed of a second material, and wherein relaxation strain characteristic of the second material is greater than the relaxation strain characteristic of the first material. Such a compound billet is formed by providing a billet blank, wherein a longitudinally extending inner element, composed of the first material, resides within a hollow, longitudinally extending outer element, composed of the second material; applying to the longitudinal ends of the inner element a longitudinal stress of a magnitude sufficient to cause the inner element to deform plastically outwardly, perpendicularly to the direction of its longitudinal extension, to such an extent as to cause the outer element also to deform plastically outwardly, perpendicularly to such direction of longitudinal extension; and then releasing the longitudinal compressive stresses at the longitudinal ends of the inner element and allowing the inner and outer elements to relax inwardly, such that a tendency toward a greater degree of relaxation strain in the outer element will cause the outer element to grasp firmly the exterior of the inner element. The compound billet formed by this technique may thereafter be extruded through a suitable die aperture so as to produce an elongated, compound product, e.g., a copper-clad aluminum wire or busbar.

5 Claims, 5 Drawing Figures

FORMATION AND UTILIZATION OF COMPOUND BILLET

BACKGROUND OF THE INVENTION

1. Field of the Invention

This invention relates to methods of forming and of utilizing a compound billet and, more particularly, to methods of forming a compound billet, wherein a longitudinally extending inner member, composed of a first material, is retained within a hollow, longitudinally extending outer member, composed of a second and different material, and of thereafter deforming the compound billet so as to form an elongated, compound product.

2. Description of the Prior Art

It is known to form a compound billet, composed of two different materials, such as a copper-covered aluminum rod, and thereafter to form a compound product, e.g., by extrusion, from the compound billet. Two examples of such compound billets, and their formation, are provided by U.S. Pat. Nos. 3,620,059 (Nilsson) and 3,937,385 (Asada et al.). Compound billets of this general type are useful in forming copper-clad aluminum wires or busbars.

U.S. Pat. No. 3,620,059 (Nilsson) discloses a compound billet in which a longitudinally extending, copper outer member closely surrounds a longitudinally extending, aluminum inner member, the inner member including a groove in its periphery. A sealing member, such as an O-ring, prevents a pressure medium from penetrating between the outer and inner members during hydrostatic extrusion of the compound billet through an aperture in a die. Thus, the compressive effect of the pressure medium on the exterior of the outer member is to be utilized to hold the outer and inner members together during such extrusion. In addition, the outer member will initially be deformed, by the pressurization during extrusion or otherwise, so as to compress that portion of the outer member, surrounding the groove in the inner member, into the groove and, thereby, increase the adhesion between the outer and inner members.

U.S. Pat. No. 3,937,385 (Asada et al.) teaches forming a compound billet by first cleaning those surfaces of a longitudinally extending, aluminum inner member and a longitudinally extending, copper outer member which are to contact one another; then positioning the inner member within the outer member so as to bring such surfaces into contact and thereby provide a compound billet blank; next sealing the interior of the outer member under vacuum conditions; and then plastically deforming a short, longitudinally extending region on the exterior of the compound billet blank inwardly, e.g., by pinching and rotating such region between mating dies or blades, so as simultaneously to produce a conical shaped nose portion on the billet blank and to bond together the inner and outer members through plastic deformation at such region.

It has been determined, however, that the relaxation strain characteristic of copper, i.e., the partially restorative strain which is experienced upon the release of a stress of sufficient magnitude to plastically deform a body of copper, is greater than the relaxation strain characteristic of aluminum, i.e., the partially restorative strain which is experienced upon the release of a stress of sufficient magnitude to deform a similar body of aluminum. Thus, any application to the exterior of a copper-covered aluminum, compound billet blank of radially inwardly directed compressive stresses, i.e., compressive stresses which are directed radially toward a longitudinally extending axis of the blank, is unlikely to provide a firm grasp of the aluminum inner element by an inwardly deformed, copper outer element, since the outer element will tend to expand to a greater degree than will the inner element upon the release of such compressive stresses.

While the techniques of U.S. Pat. Nos. 3,620,059 and 3,937,385, as discussed, may provide useful compound billets for extrusion into elongated, compound products, it is believed that neither reliably provides a firm retention of a longitudinally extending inner member by a hollow, longitudinally extending outer member over a substantial portion of the area of engagement between the respective external and internal surfaces of the two members. Thus, some slippage of portions of the outer member with respect to adjacent portions of the inner member, e.g., along a longitudinal direction, may be present during extrusion, resulting in non-uniformities and/or other structural defects in the extrusion product. This is particularly true where the relaxation characteristic of the material of the outer member is greater than the relaxation characteristic of the material of the inner member, e.g., for a copper-covered aluminum billet, as is the case with respect to the two previously mentioned patents.

SUMMARY OF THE INVENTION

The invention contemplates the provision of simple, quick and low-cost methods for the formation and utilization of a compound billet, i.e., a billet which includes a longitudinally extending inner member, composed of a first material, located within the interior of a hollow, longitudinally extending outer member, composed of a second and different material, wherein the inner member is retained firmly within the outer member over a substantial portion of the area of engagement between the respective external and internal surfaces of the two members, i.e., over a major portion, and preferably over the entirety, of such area of surface engagement. The first and second materials may be aluminum and copper, respectively, or may be any other pair of materials wherein the relaxation strain characteristic of the second material is greater than the relaxation strain characteristic of the first material.

The formation of such a compound billet in accordance with the principles of the invention involves an initial step of providing a billet blank in the form of a longitudinally extending inner element within a hollow, longitudinally extending outer element. The inner element is composed of the first material, while the outer element is composed of the second material and has internal dimensions, in a plane perpendicular to the direction of longitudinal extension of the inner and outer elements, which are no less than the external dimensions of the inner element in such perpendicular plane, such that the inner and outer elements face one another over a substantial area of surface proximity.

The described billet blank is then formed into the desired compound billet through a plastic deformation of both the inner element and the outer element, in a direction perpendicular to the previously mentioned direction of longitudinal extension, over at least a major portion, and preferably over the entirety, of the area of surface proximity between the two elements, in such manner that the outer element grasps firmly the exterior of the inner element over at least a major portion, and preferably over the entirety, thereof. In particular, stresses are applied to both the inner element and the outer element in such manner as to plastically deform both of the elements radially outwardly, i.e., outwardly in the previously mentioned perpendicular plane from a central longitudinal axis of the inner element, over at least a major portion of the area of proximity between the surfaces of the two elements. The outwardly directed stresses required for such plastic deformation may be imposed on both the first element and the second element through the application of a longitudinal compressive stress of sufficient magnitude to both longitudinal ends of the inner element. Upon the release of the outwardly directed stresses, the first and second elements will both relax inwardly. A greater degree of such inward relaxation will tend to occur in the outer element, causing the outer element to grasp firmly the exterior of the inner element and thereby forming the desired compound billet.

Subsequent to its formation in the manner described, such a compound billet may be passed, along the direction of its longitudinal extension, through an aperture in a die, e.g., through the performance of an extrusion operation on the compound billet, so as to form an elongated, compound product with a core composed of the first material and a casing of the second material.

DETAILED DESCRIPTION

Figure 1:
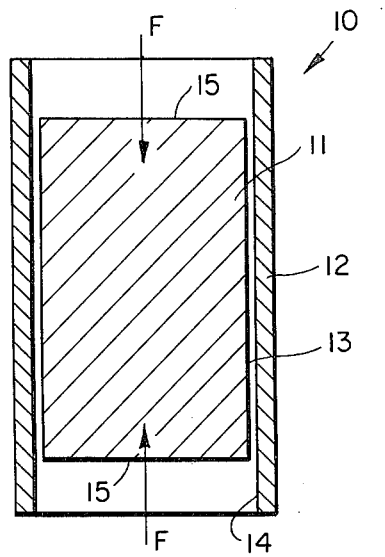
FIG. 1 of the drawing is a longitudinal sectional view of a blank, to be formed into a compound billet in accordance with the principles of the invention, which blank includes inner and outer elements composed of different materials.

Referring initially to FIG. 1 of the drawing, a blank 10 for forming a compound billet 10' (FIG. 4) includes an inner element 11, composed of a first material, and an outer element 12, composed of a second and different material. The two materials are of such nature that the relaxation strain characteristic of the second material, i.e., the partially restorative strain which is experienced upon the release of a stress of sufficient magnitude to plastically deform a body of the second material, is greater than the relaxation strain characteristic of the first material, i.e., the partially restorative strain which is experienced upon the release of a stress of sufficient magnitude to plastically deform a similar body of the first material. For example, the first material may be aluminum, while the second material may be copper, in which case the compound billet 10' will be composed of copper-covered aluminum.

The inner element 11 and the outer element 12 both extend in a longitudinal direction, i.e., the vertical direction in FIG. 1 of the drawing. The outer element 12 is hollow, and is so shaped as to receive within its interior the inner element 11, with an external surface 13 of the inner element 11 facing an internal surface 14 of the outer element 12 along an area of proximity between the surfaces 13 and 14. For example, the inner element 11 may constitute a right-circular cylinder, and the outer element 12 may be a right-circular cylindrical tube, with the outer diameter of the inner element 11 being no greater than the inner diameter of the outer element 12. Of course, inner and outer elements 11 and 12 of other, preferably similar, shapes would be equally appropriate.

It is desired that the blank 10 be formed into a compound billet 10' (FIG. 4) wherein an inner member 11', corresponding to the inner element 11, is retained firmly within the interior of an outer member 12', corresponding to the outer element 12, over a substantial portion of the area of surface engagement between the two members, i.e., over at least a major portion, and preferably over the entirety, of such area of surface engagement. The desired compound billet 10' may be so formed by means of an application of a longitudinal compressive stress of sufficient magnitude to opposite longitudinal ends 15,15 of the inner element 11 of the blank 10, followed by the release of such stress.

Figure 2:
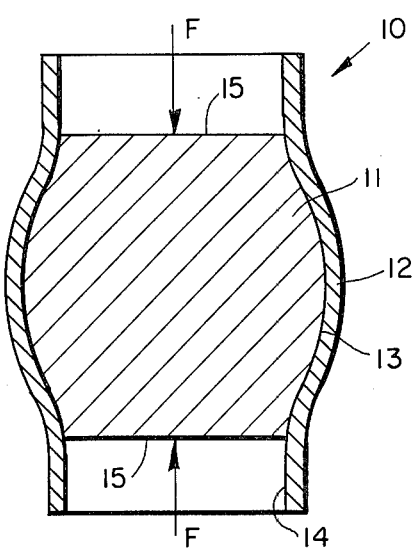
FIGS. 2–4 are longitudinal sectional views illustrating successive stages in the formation of the compound billet from the blank of FIG. 1.

Thus, as is shown in FIGS. 1 and 2 of the drawing, longitudinal forces F,F are initially applied to the ends 15,15 of the inner element 11, for example upon the insertion of the blank 10 into a suitable press, in order to impose the required longitudinal stress on the inner element 11. The level of compressive stress required in performing the method of the invention must be sufficient first to cause the inner element 11 to be plastically deformed outwardly in a plane perpendicular to the longitudinal direction, i.e., horizontally outwardly in FIGS. 1 and 2, and thereupon to cause the outer element 12 also to be plastically deformed outwardly in a similar sense. Preferably, the outward plastic deformation of the two elements 11 and 12 occurs over substantially the entire area of proximity between the respective surfaces 13 and 14 of the elements. Thus, the configuration of the blank 10 is transformed from that shown in FIG. 1 to that shown in FIG. 2.

Figure 3:
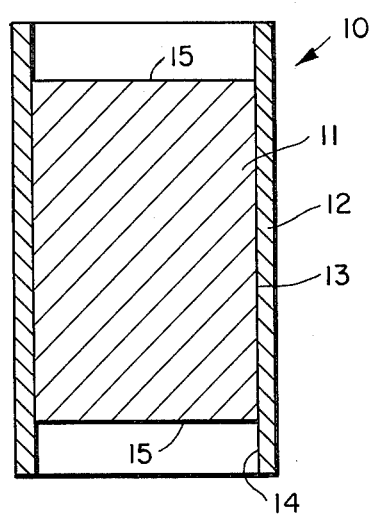

Following the commencement of the application of the plastic deforming forces F,F to the ends 15,15 of the inner element 11, and preferably only very shortly thereafter, the forces F,F are released. The inner element 11 and the outer, element 12 thereupon both relax inwardly, entering into the configuration of FIG. 3 of the drawing. Since the degree of inward relaxation tends to be greater in the outer element 12 than in the inner element 11 due to the nature of the respective materials of the two elements, the outer element 12, along its internal surface 14, will now be grasping the external surface 13 of the inner element 11, so as to retain the inner element 11 firmly within the interior of the outer element 12. Such firm retention will occur along an area substantially corresponding to the area along which outward plastic deformation of the two elements 11 and 12 was previously induced, i.e., preferably substantially the entire initial area of proximity between the surfaces 13 and 14 of the respective elements.

Figure 4:
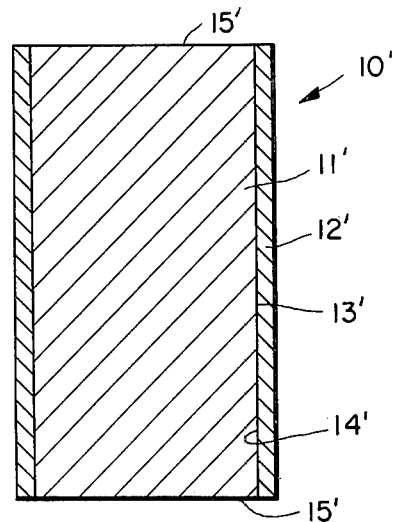
Figure 5:
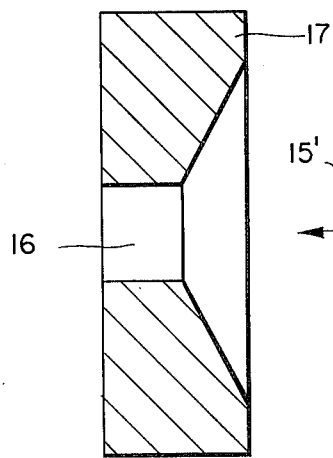
FIG. 5 is a longitudinal sectional view of a die, and of the finished compound billet of FIG. 4, illustrating a method for utilizing the compound billet in the manufacture of an elongated, compound product.
Figure 5:
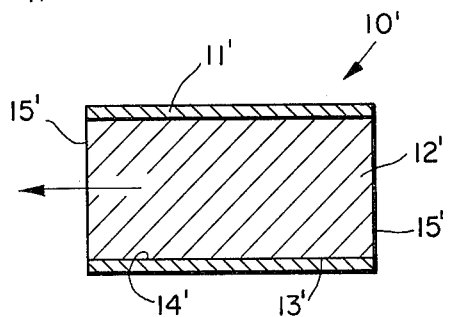

If necessary, the ends of the billet blank 10 may next be trimmed off in such manner as to form the desired compound billet 10' depicted in FIG. 4 of the drawing. The billet 10' now includes an inner member 11' and an outer member 12' of corresponding longitudinal extent, with the inner member 11' firmly grasped, along its external surface 13', by the outer member 12', along its internal surface 14' between opposite longitudinal ends 15',15'.

The compound billet 10' may thereafter be transformed into an elongated, compound product by the performance on the billet 10' of any suitable deforming operation or operations, e.g., by the extrusion of the billet 10' longitudinally through a suitably shaped aperture 16 in a die 17. The die 17 may correspond to that disclosed in my copending application, Ser. No. 683,589, filed May 5, 1976 and entitled, "Forming an Elongated Product." Any appropriate extrusion methods and apparatus may be employed, e.g., those discolsed in U.S. Pat. RE 28,795 (Fuchs). The resulting elongated, compound product will have a core, composed of the first material, surrounded by a casing, composed of the second material.

It is to be understood that the described methods are simply illustrative of preferred embodiments of my invention. Other embodiments might, for example, be directed to the formation and utilization of compound billets of other than circular cross-section and/or compound billets of combinations of materials other than copper and aluminum, although preferably having similar relative properties. Indeed, compound billets of more than two materials with suitable relative properties may be provided by methods substantially similar to those discussed previously. Many other modifications may also be made in accordance with the principles of my invention.

What is claimed is:

1. A method of forming a compound billet, wherein a solid, longitudinally extending first member, composed of aluminum, is retained firmly within a hollow, longitudinally extending second member, composed of copper, the method comprising the steps of:
    a. providing a solid, longitudinally extending first element within a hollow, longitudinally extending second element, said first element being composed of aluminum and having predetermined external dimensions in a plane perpendicular to the direction of longitudinal extension, and said second element being composed of copper and having internal dimensions in said perpendicular plane at least equal to said predetermined external dimensions of the first element;
    b. applying to the longitudinal ends of the solid, first element a longitudinal compressive stress of a magnitude sufficient to cause the first element to deform plastically outwardly, perpendicularly to said direction of longitudinal extension, to such an extent as to cause the second element also to deform plastically outwardly, perpendicularly to said direction of longitudinal extension; and then
    c. releasing the longitudinal compressive stress at the longitudinal ends of the first element and allowing the first and second elements to relax inwardly, such that a tendency toward a greater degree of relaxation strain in the copper, second element will cause the second element to grasp firmly the exterior of the aluminum, first element, thereby forming said compound billet.

2. A method as set forth in claim 1, wherein step (b) comprises:
    d. plastically deforming each of said elements along the entire area of surface porximity between said elements.

3. A method as set forth in claim 1, further comprising:
    d. thereafter passing the compound billet, along said direction of longitudinal extension, through an aperture in a die so as to form an elongated, compound product.

4. A method as set forth in claim 1, wherein step (a) comprises:
    d. positioning a solid cylindrical first element, having a predetermined diameter, within the bore of a tubular second element, having an inner diameter at least equal to said predetermined diameter of the cylindrical first element.

5. A method of forming an elongated product, wherein a solid core, composed of aluminum, is surrounded by a casing, composed of copper, the method comprising the steps of:
    a. providing a solid, longitudinally extending first element within a hollow, longitudinally extending second element, said first element being composed of aluminum and having predetermined external dimensions in a plane perpendicular to the direction of longitudinal extension, and said second element being composed of copper and having internal dimensions in said perpendicular plane at least equal to said predetermined external dimensions of the first element;
    b. applying to the longitudinal ends of the solid, first element a longitudinal compressive stress of a magnitude sufficient to cause the first element to deform plastically outwardly, perpendicularly to said direction of longitudinal extension, to such an extent as to cause the second element also to deform plastically outwardly, perpendicularly to said direction of longitudinal extension; then
    c. releasing the longitudinal compressive stress at the longitudinal ends of the first element and allowing the first and second elements to relax inwardly, such that a tendency toward a greater degree of relaxation strain in the copper, second element will cause the second element to grasp firmly the exterior of the aluminum, first element, thereby forming a compound billet; and thereafter
    d. passing said compound billet, along said direction of longitudinal extension, through an aperture in a die.

* * * * *